Figure 1:
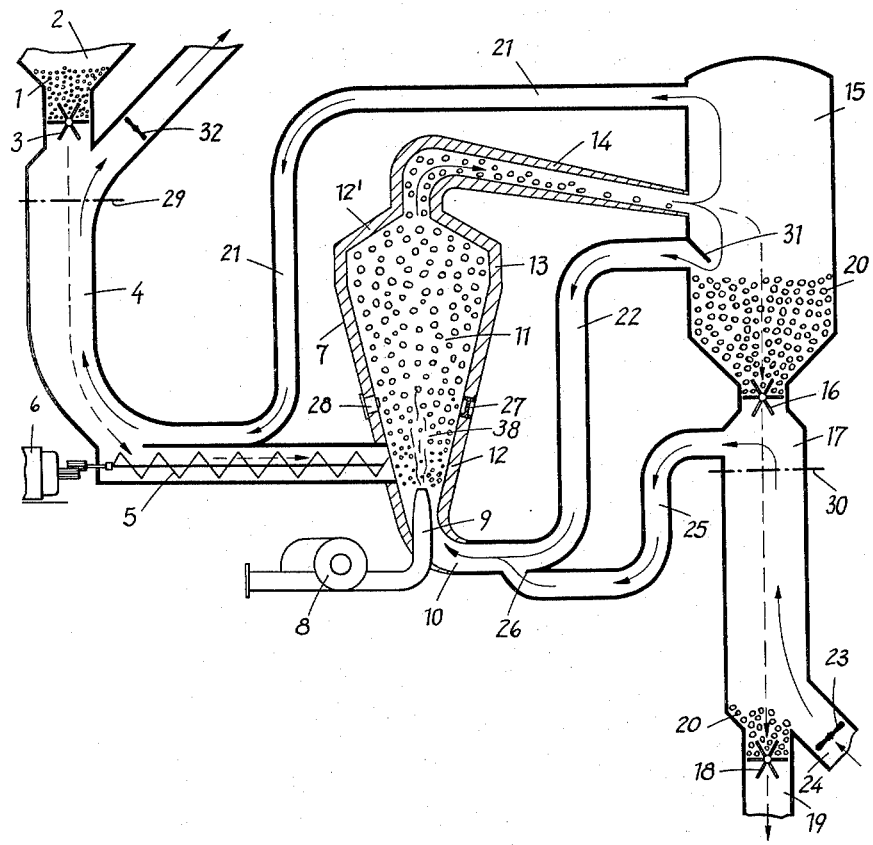

Jan. 21, 1964     H. DENNERT     3,118,658
APPARATUS FOR MANUFACTURING A POROUS MATERIAL
SUCH AS BLOWN CLAY, BY HEATING
Filed Jan. 17, 1961     4 Sheets-Sheet 1

INVENTOR:
H. Dennert
By Glascock Downing Seebre
ATTYS.

INVENTOR:
H. Dennert

United States Patent Office

3,118,658
Patented Jan. 21, 1964

3,118,658
APPARATUS FOR MANUFACTURING A POROUS MATERIAL SUCH AS BLOWN CLAY, BY HEATING
Heinz Dennert, Viereth, Upper Franconia, Germany, assignor to Veit Dennert K.G., Schlusselfeld, Germany
Filed Jan. 17, 1961, Ser. No. 83,251
Claims priority, application Germany May 25, 1960
1 Claim. (Cl. 263—21)

The present invention relates to a device for the manufacture of a porous material, and more particularly of blown clay, by heating the starting material to high temperatures (firing, sintering calcination). In this process, there arises the problem of preventing the agglomeration of the material which is favoured by the volumetric increase during the heating. Such agglomeration may occur between the individual grains, or between otherwise formed bodies, or these may adhere to the wall of the kiln.

In the production of blown clay, which is produced, as known to the art, from suitable, blowable clays or slate, there results the further difficulty that the transition from the drying or preheating temperature of about 800° C. to the sintering temperature of about 1100 to 1200° C., and preferably between 1150 and 1200° C., must be effected suddenly, that is, by jumping the temperature gap between these two temperature ranges. The reasons are the following: In the production of blown clay it is obviously important to produce a highly porous material, that is a material with low bulk weight. This is important both for the technical properties, such as the insulating effect, and also for the economy of the manufacture, since the freight charges and the sales price of blown clay are the more favourable, the lower its volumetric weight or density. In addition, since the grain of blown clay is also used as mortar additive, it must be comparatively firm in spite of its porosity and have a somewhat rough surface in order to improve the bond.

The production of a low density depends on the fact that the blowing capacity inherent in the starting material for the production of blown clay is due to the formation of gases, such as from carbonates, bitumen, or the like, during the heating, and that this capacity is used to its fullest extent. This can be the case only if care is taken that these blowing gases cannot escape through the surface. This may be achieved, in principle, by means of the vitreous sealing skin forming on the surface of the grains during heating at sintering temperature. Thus, the problem is, shortly, to suppress the formation of the blowing gases until this skin has been formed.

Hitherto known methods are unsatisfactory, both as concerns the prevention of the agglomeration and the production of a low volumetric weight. In addition, the manufacture of blown clay was hitherto very uneconomical. This was caused by the high costs of the firing kilns which was, in turn caused by the necessity of providing these kilns with special equipment, whereby the material was kept in constant motion in order to prevent its agglomeration.

Hitherto, there have been known mainly two methods for the production of blown clay, namely rotary kiln sintering and the so-called suction sintering. The last method will not be dealt with in detail, because its disadvantages are very obvious. This method does not yield a granulated material, having the properties determining the quality of a blown clay, but a cake which must be broken up after the blowing or sintering. A further disadvantage of this method is that the blown clay produced thereby is not sufficiently strong, the lack of strength being probably due to the incorporation of fuel particles (carbon), added to the alminiferous or siliceous material to be sintered (clay, slate) in order to improve the blowing effect, into the structure of the blown clay. In addition, the disadvantages specified below for the rotary kiln and affecting the economy of the method, also apply generally to this method.

A rotary kiln plant, such as is required for a capacity of 135 tons per day, corresponding to about 400 m.$^3$ blown clay, requires an investment of between £62,500 and £130,000. This sum does not include the preparation of the material prior to the introduction into the kiln and after its extraction therefrom.

The dimensions of the rotary kiln, necessary for the production capacity mentioned above (about 40–50 m. length and about 2.5 m. diameter) necessitate naturally a very high consumption of refractory materials (fire bricks), taking also into account that the inner lining of the kiln must be fairly thick (15–20 cm.), in view of the high stresses. Wear of the lining in the course of time cannot be avoided so that the expensive kiln lining must be replaced or repaired. This has the considerable disadvantage that the entire plant must be stopped, a disadvantage which will be dealt with further below.

The large dimensions of the rotary kiln require large operational areas. In addition, with such a kiln, additional structures, superstructures and fitting are very difficult to execute and these must in these cases be overdimensioned.

For reasons of economy and of its longitudinally axial arrangement, the rotary kiln must be operated continually. Any operational interruption damages the rotary kiln in its entirety. During the running down it must be controlled for hours and even days, in order to prevent distortion and damage to the brickwork during the cooling. This increases the wages bill and requires also expensive and very accurate control equipment.

In view of its size and the initial cost, the capacity of the rotary kiln must be used at a predetermined output and in continuous operation. With decreasing output, overheads will rise immediately and considerably. Such a rotary kiln does not make it possible to adapt the production to the market situation.

Another disadvantage in the operation of this rotary kiln is the extraordinarily high power consumption of the rotational drive of a kiln having the large dimensions mentioned hereinbefore. Owing to the size of the rotary kiln, and in view of the required heating of a space with very large dimensions as compared with the charge and of the corresponding heating surfaces (walls), it is impossible to obtain an economical heat balance.

The best possible utilization of the heat produced is impossible, owing to the high radiation losses, caused by the large surface of the kiln shell. These radiation losses represent the most important loss factor in the heat balance of any rotary kiln.

A further disadvantage of the rotary kiln method is that the charge (granulate or other formed bodies) is predried in the kiln itself. As is well known, this preliminary drying must be effected very gradually to avoid steam explosions and the bursting of the material already during the application of the charge. This preheating may be continued only until the water on the surface and partly also the chemically combined water is expelled. Under no conditions, however, should the blowing constituents of the clay become active during the preheating, since otherwise, before the material reaches the sintering range temperature, the optimum blowing effect and thus also the minimum volumetric weight cannot be reached .

Obviously, these optimum conditions for the preheating cannot be preset during the continuous operation of a rotary kiln, whether this is designed coaxially in one or several parts, unless very expensive additional technical equipment is provided for this purpose. At any rate, the direct connection of the preheating zone before the actual sintering zone within the closed space of the kiln necessitates considerable and expensive installations, which are subjected to considerable wear, due to the effects of friction and the application of heat.

Another important disadvantage of the rotary kiln is that the sudden jump from the predrying or preheating temperature (below approx. 800° C.) to the sintering or blowing temperature (1100–1200° C.), necessary to produce a low density, is extremely difficult to realize, and is possible only by means of expensive kiln installations and special equipment, for example by providing a part of the kiln with faster rotation.

Another problem arising in connection with the rotary kiln is the undesirable agglomeration of the sintered material. Particularly blowable clay tends to such agglomeration. The critical ranges are either in the transitional zone between the preheating temperature and the sintering temperature, because this transition cannot be effected suddenly in a rotary kiln, quite irrespectively of the arrangements or installations provided for this purpose; or else, this agglomeration takes place in the sintering zone itself, because smaller grains reach the kiln walls and are not, or only insufficiently within the range of the blowing or sintering temperature; these grains melt or reach a state of plasticity and adhere to other smaller or larger particles. This may give rise to botryoidal formations, which are not only useless, but can also be removed only at great expense, loss of time, and sometimes also necessitate the stopping of the entire plant. This entails, in turn, again the disadvantages mentioned above and resulting from the stoppage of the kiln.

It may, therefore, be said that the problem of agglomeration of the sintered material in the rotary kiln present a problem which cannot be fully satisfactorily solved.

According to the present invention, the disadvantages of the known methods for firing, sintering or calcinating a material, the volume of which increases with simultaneous decrease of its specific weight under the application of heat, may be avoided. The invention will be further described, by way of the example of the production of blown clay.

According to the invention, the heating of the preferably granulated starting material of the blown clay is effected by means of the vortex sheet or fluidized bed method known per se. In this method, the material is held in suspension by a strong current of gas. Hitherto, this method has never been used for the purpose of the invention. This is the more surprising in view of the quite considerable advantages resulting from the use of the fluidized bed method for the production of blown clay and other heat-blowable materials, such as cement or quick ash, containing blowable constituents, such as carbon or bitumen. Primarily, this eliminates completely the danger of agglomeration of the material to be fired, either between the grains, or between the material and the kiln wall, because the material is in a state of continuous turbulence. This effect is obtained without the expensive kiln installation, necessary with known designs in order to keep the material in motion. This also results in a much better economy of the method of the invention as compared with the rotary kiln. The savings of plant costs are about 70%, compared to an equivalent rotary kiln. Other details connected with the cheaper design of the plant according to the invention will become apparent from the ensuing description of the sintering kiln according to the present invention.

The use of the fluidized bed method for the production of blown clay is important, not only for the economy, but also for the quality of the end product. Since the suspended grains, granulated materials or other formed bodies are subjected to the application of heat in a uniform manner, the formation of the sealing skin on the surface of the grains, preventing the escape of the blowing gases, is effected uniformly, resulting naturally in the best possible utilization of the inherent blowing capacity of the initial material and in a very low volumetric weight.

The fluidized bed method used according to the invention for the production of blown clay yields also a material with largely uniform particle size; this is due to the fact that the discharge of the material from the kiln is effected as a function of the increased volume of the individual grains and the increased lift caused thereby. This also guarantees that only fully blown material leaves the kiln.

In order to improve the heat balance, thereby also the economy of the fluidized bed method, according to another embodiment of the invention, a part of the hot waste gases leaving the top of the kiln, are again re-introduced into the same.

In order to regulate the discharge from the kiln as a function of the degree of blowing of the individual grains or the like, it is proposed according to the invention that the diameter of the kiln, in the direction of the material flow, first increases and then again decreases. Since this increase and decrease in the cross-section of the kilns, also accompanied by a corresponding change in the velocity of the gases suspending the particles, the staying time and with it also the degree of blowing can be adjusted to the desired values by the appropriate selection of the dimensions of the kiln. The staying time may, of course, also be regulated by the flow velocity of the gases in the kiln.

Preferably, the kiln has the shape of a double cone or double frustum.

In order to effect the regulation of a certain staying time of the material in the kiln, as outlined above, there may be provided, according to another feature of the invention, an intermediate part of cylindrical shape between the tapering parts of the kiln. Generally, the lower part of the kiln, widening in the direction of flow, is longer than the upper part, which becomes narrower in the direction of flow.

The staying time, which may be up to 15 minutes, depends on the size of the granulate forming the charge, its thermal conductivity, the specific heat consumption, the weight, the sintering temperature, the air velocity and the gas temperature in the fluidized bed kiln.

An indication for selecting the optimum kiln dimensions is given by the rule according to the invention that the ratio between the maximum kiln cross-section and the minimum cross-section in the range of the entry of the material into the kiln should correspond to the ratio of the cross-sections between the grain in its fired and unfired state.

The savings in installation costs, effected by means of an installation for the production of blown clay according to the invention in comparison with a rotary kiln plant of comparable performance, and amounting, as mentioned hereinbefore, to about 70%, are due to the reduction of the heated space (heated surface) to 20–25%. Thus, the requirements of the very expensive refractory lining material for the firing chamber are much lower.

However, one of the main features is that no wearing parts are required for the movement of the material, and that, therefore, mechanical and thermally conditioned wear is eliminated. In addition, the very large amount of energy necessary for the operation of a rotary kiln, also becomes superfluous.

The savings in ground area with the installation of the invention amount to at least two thirds. Operational stoppages or the stopping of the entire plant are possible, without the risk of damage to the kiln; this is a further advantage over the rotary plant.

The plant of the invention does not require any heating up time, because the material can be fired at flame temperature.

The savings of operating and maintenance personnel are at least 50%.

A special advantage of the fluidized bed kiln in the production of blown clay is the possibility of the sudden transfer of the predried and preheated material from a drying or preheating temperature of below 1000° C., and more particularly between 750° C. and 850° C., to the sintering temperature of between 1100 and 1200° C., prevailing continuously in a space which is much smaller than in a rotary kiln. Preferably, a drying temperature of about 800° C. is selected.

It was found to be expedient to locate the suspension zone of the material outside the range of the flame heating the material. This supports the formation of a uniform and steady heating gas-air current flow in the suspension zone. This is usually impossible, if the burner flame reaches into the suspension zone, due to temperature gradients within the flame itself. Uneven flow conditions in the suspension zone favour the agglomeration of the granulate charged into the kiln above the burner nozzle, and may result in blockages of the nozzle.

According to the invention, the shifting of the suspension zone outside the burner flame range may be effected by arranging the burner at a distance from the suspension zone corresponding at least to the length of the flame. According to one embodiment of the invention, the burner is therefore arranged to form a right or acute angle with the longitudinal axis of the kiln. The kiln may, at its base, terminate in a duct arranged at a right or acute angle relative to its longitudinal axis; the burner is located in this duct so that the burner axis is in the direction of the axis of the duct. The duct, which may be regarded as heating intake, may be made from the same material as the kiln or from another suitable material. The kiln may be made of brickwork, for example of refractory bricks, such as chamotte, or of a steel shell, with suitably lined inner walls.

Due to the displacement of the burner flame outside the suspension zone, a uniform, hot, gas current reaches the actual kiln space, so that eddying is largely eliminated.

Apart from the fact that the arrangement of the invention eliminates the risk of burner blockages and the resulting operational stoppages, a slanting or horizontal burner is easier to supervise and to regulate. In this case, no large space is required under the kiln, such as required with vertically arranged burners. The kiln may be located much lower, which simplifies the construction of the whole plant.

In order to prevent a blockage of the heating intake, there is provided, according to the invention, a discharge aperture at the junction between kiln and duct; this discharge hole is located in the kiln wall, may be closed, and serves to withdraw granulated material falling down from the suspension zone.

Another cause of operational failure with the fluidized bed method may be that, owing to the high flow velocity of the air supplied into the fluidized bed kiln from the bottom, the grains are blown back into the charging hole leading into the kiln wall. In order to prevent this, there is provided, according to another feature of the invention, that the charge channel does not terminate in the lower part of the kiln, where the flow velocity is very high, but about at half height or higher in the fluidized bed kiln, so that the charging duct forms with the longitudinal axis of the kiln preferably an acute angle. The charge tube is preferably designed as gravity tube, because this design will eliminate the provision of a special conveyor, for example a screw. In addition, this will further reduce the danger of operational stoppages. The granulated matter reaches the kiln from the gravity tube under the effects of the force of gravity. The duct may be closed against the feed hopper for the granulated matter by means of a suitable closing means, for example a bucket wheel.

The invention is more particularly applicable to the manufacture of blown clay. However, it is also applicable to any other blowable material, for instance flue dust or quick ash, or cements, which contain inflating agents.

Further features of the invention are concerned with the case in which the material supplied to the fluidised-bed kiln does not have a substantially uniform grain or granulate size. In this case, the larger grains concentrate in the lower region of the kiln during the heating treatment. If the discharge of the material from the furnace takes place continuously, when the particle sizes differ the larger particles will collect in the bottom of the kiln and will therefore remain in the kiln longer than the smaller grains or granulated material which accordingly may under certain circumstances be discharged prematurely, that is to say, in an incompletely fired state. But in order to obtain a material with constant characteristics, it is important that the time of discharge should be the same for all particles of material.

For this purpose, it is proposed, according to a further feature of the invention, that when a material with substantial differences in grain or granulate size is being used, the whole kiln charge should be intermittently discharged by intermittent regulation of the air current entering the kiln at the bottom. The discharge thus takes place irrespectively of the size of the finished particles. This ensures that all particles are subjected to the same heating treatment irrespectively of their size, and this in turn produces uniform quality of the discharged material.

For producing the intermittent discharge of the whole furnace charge, it is proposed that regulation of the air current introduced into the kiln should take place at certain intervals of time; this regulation may be effected by intermittently introducing a strong air current, whereby all of the material located in the kiln is discharged at the top of the kiln.

Another possibility consists in intermittently interrupting or throttling the air current, so that the particles fall back out of the suspension zone. The particles may subsequently be drawn off through a regulable opening provided in the kiln wall below the suspension zone.

According to a further feature of the invention, the air current introduced into the kiln may be intermittently diverted, below the suspension zone, for the purpose of intermittently discharging the entire kiln charge. In this case also, the grains or granulated material fall back out of the suspension zone. In this case also, the finished material may be drawn off through a regulable opening in the kiln wall. The air current is preferably diverted through the withdrawal opening for the material, whereby the discharge of the particles is assisted.

In order to carry out the process more economically, according to a further feature of the invention the intermittent discharge of the entire kiln charge may be effected by automatic regulation of the air current at particular intervals of time.

The invention is of course not restricted to the heating treatment of a material of which the volume increases in heat while at the same time the specific weight of the material decreases, although this is a preferred application of the invention. Basically, however, the invention may also be applied to firing, calcining or sintering a material, for instance cement grains, of which the particles when heated do not expand or expand only slightly and also do not undergo any substantial reduction of their specific weight.

The kiln may be charged continuously or periodically, independently of the manner in which the air current introduced into the kiln is regulated, in each particular case, for the purpose of intermittently discharging the kiln charge.

Further details of the invention will become apparent from the following description in conjunction with the accompanying drawing, showing four embodiments thereof. The description also explains the thermal flow of the entire plant. Identical parts are marked with the same reference numerals.

Figure 2:
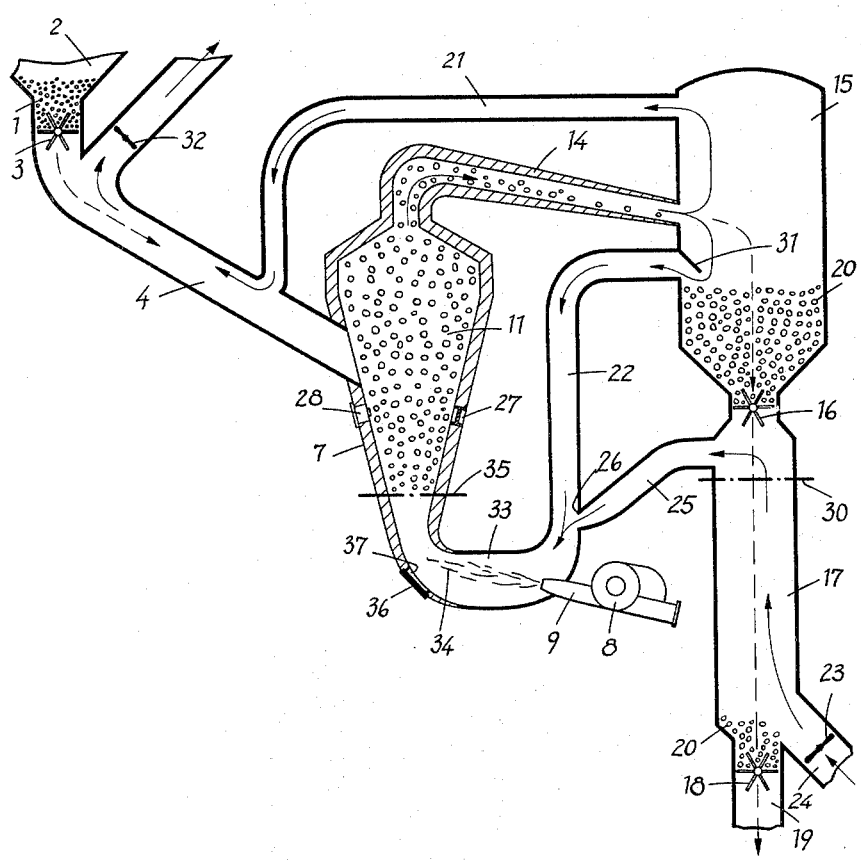
Figure 3:
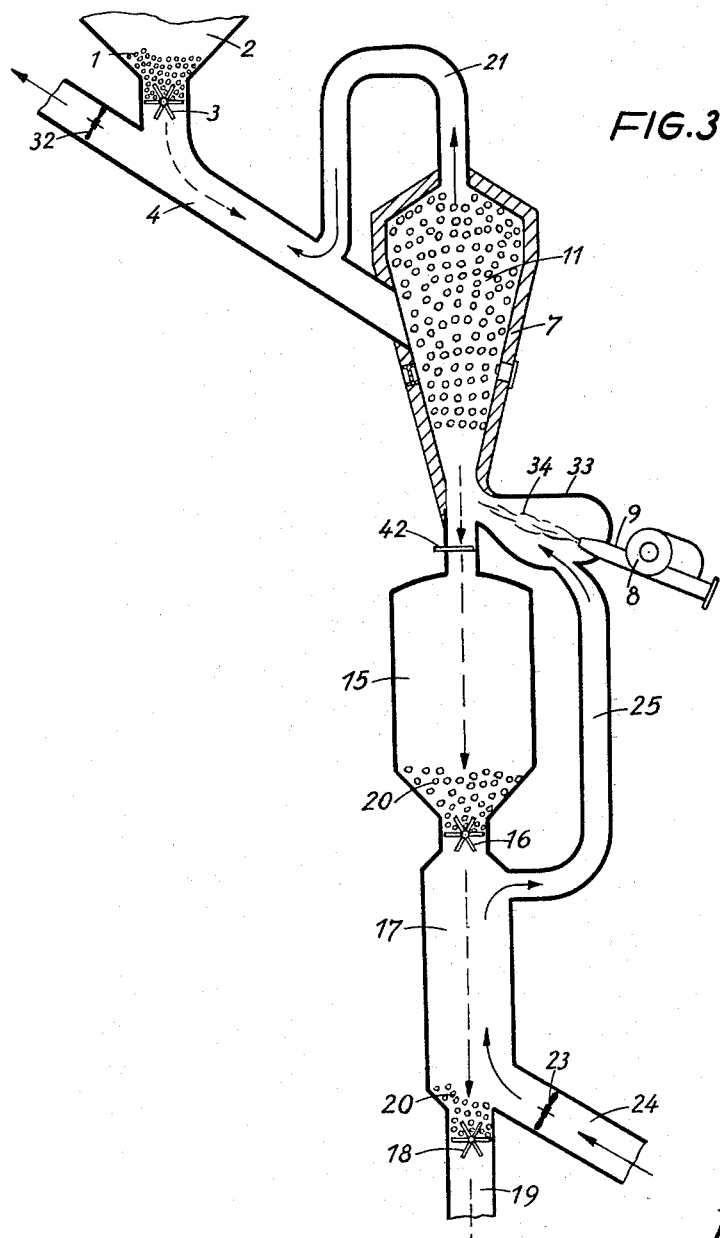
Figure 4:
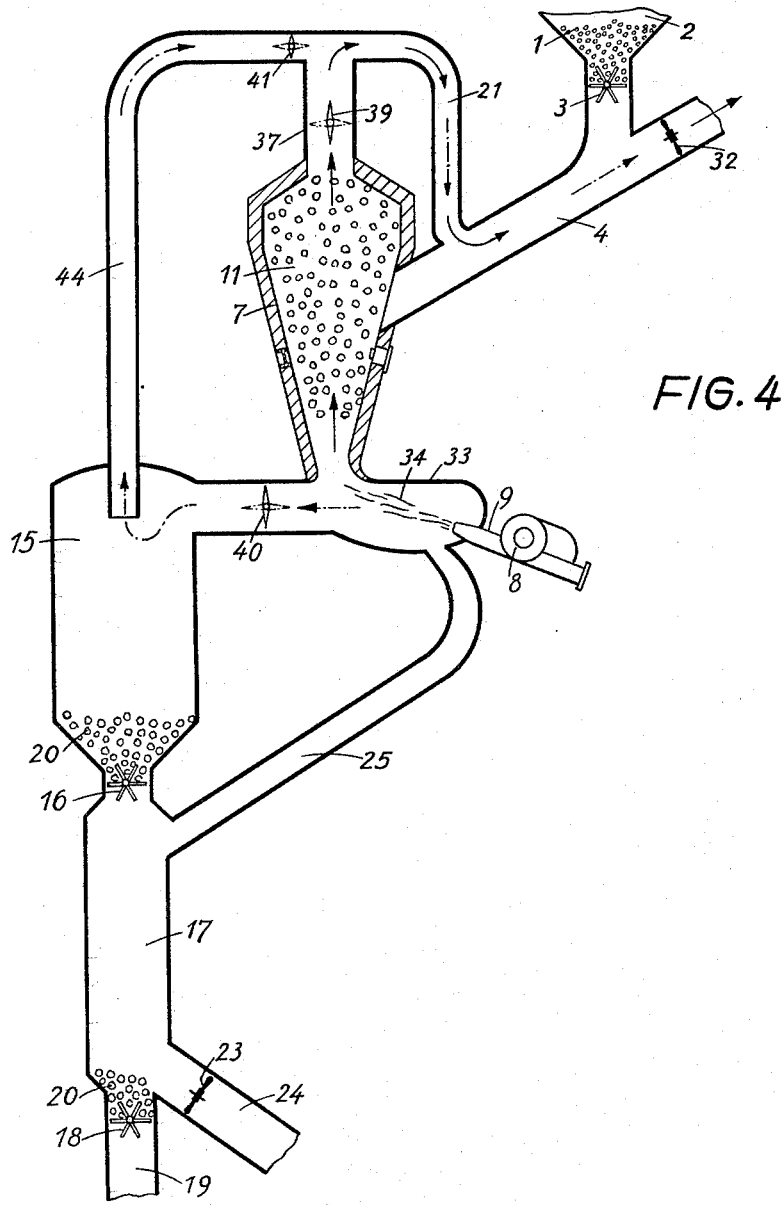

In these drawings:

FIGURE 1 shows an installation in which the granular material is fed to the kiln by means of a screw conveyor, FIGURE 2 shows an installation in which the material is fed to the kiln by gravity, FIGURE 3 shows an installation in which the air current is throttled or stopped so that the material falls back out of the suspension zone through a regulable opening provided underneath the suspension zone, and FIGURE 4 shows an installation in which the air current is deflected through the withdrawal opening for the finished material, for the purpose of intermittently discharging the kiln charge.

In the embodiment of FIGURE 1 of a plant for realizing the method of the invention, the granulate 1 of the blowing clay is supplied from a feed hopper 2, through a closing device, for example a bucket wheel 3, to the charging duct 4. Preferably, the grain size is not less than 1 mm. The granulation may be effected with the addition of sulphite liquor, to improve the blowing effect. Duct 4 serves to predry and preheat the material. It is usually filled to about line 29. In this duct the grains fall onto a screw conveyor 5, driven by a motor 6. By this screw conveyor they are carried to the fluidized bed chamber 38 of the fluidized bed kiln 7, which is supplied with combustion gas by the fan 8 and the burner 9, and with air by the duct 10. The grains expand under the influence of the heat and are driven by the air supplied by the pipe 10 and the burning gas from the nozzle 9, out of fluidised bed zone into the chamber 11, of the fluidized bed kiln, increasing their volume. This chamber 11 consists of a lower, cone-shaped part 12 with the fluidized bed zone, a cylindrical part 13, the length of which is adapted to the prevailing conditions, and an upper truncated cone part 12'. Sight glasses 27 and connectors 28 are also provided.

The blown grains are carried by the air and gas current through the duct 14 and reach a cyclone 15. Here they fall through another closing device, for example a bucket wheel 16, into a cooling chamber 17, filling the same to about the line 30, and then through a further closing means, for example a bucket wheel 18, into the discharge pipe 19.

In the cyclone 15, the blown granulate 20 is separated from the gases flowing through the duct 14. A part of these gases flows through a pipe 21 into the feed channel 4, and dries in counter-flow the grains supplied by the bucket wheel 3.

Another part of the gases flows through a pipe 22, the inlet of which may be protected, as by a baffle 31, to the burner 9; during its travel it is mixed with fresh air, supplied by a fan 23 through a pipe 24 into the cooling chamber 17. The incoming air extracts the heat from the granulate passing through chamber 17 and is heated in the process. It is then supplied, through a pipe 25 having a nozzle-shaped restriction 26, into the pipe 10 and to the burner 9.

A part of the combustion gases is extracted from the feed channel 4 by a fan 32.

In FIGURES 2, 3 and 4, the grains 1 of the material to be fired, calcined or sintered pass from the feed hopper 2 to the charging duct 4 by way of a bucket wheel 3. This channel is used both for pre-drying and also for preheating the input material. In each case the charging duct is formed as a gravity feed pipe, so that the grains pass into the kiln chamber 11 under the action of gravity. The charging duct 4 leads through the wall of the fluidised-bed kiln 7 and is inclined to this wall.

The kiln chamber 11 ends, at the bottom, in a horizontally arranged heating flue 33 of bulging shape. The burner 9 provided with the fan 8, and the flame 34 of this burner, are not disposed exactly in the direction of the axis of the heating flue. This ensures satisfactory mixing of the heating material issuing from the burner nozzle with the fresh air supplied from the pipe 25. Of course, the burner may alternatively be arranged in the direction of the axis of the heating flue.

The arrangement of the heating flue and burner as illustrated and described above is for the purpose of preventing the flame 34 from extending into the suspension zone inside the kiln chamber 11, which zone extends above the line 35 in FIGURE 2; this would lead to non-uniform heating of the individual grains in the furnace chamber 11, and also to caking.

In FIGURE 2, a discharge hole 37 is provided at the point of transition from the kiln chamber to the flue 33 and can be closed by means of a slide 36.

In the embodiment illustrated in FIGURE 3, after the air current supplied to the heating flue 33 through the pipe 25 has been throttled or stopped the finished grains can be drawn off out of the kiln chamber 11 from the bottom of the kiln 7 into the collecting container 15' through an opening which can be closed by means of a slide 42. The fired or sintered grains 20 fall out of the container 15 through a closing device, for instance a bucket wheel 16, into the cooling chamber 17 and thence into the discharge pipe 19 through a further closing device 18. The fresh air is sucked in through the duct 24 by means of a fan 23 arranged in this duct, and then passes into the container 17, whereby the grains 20 which are still hot are cooled and the fresh air is preheated and then passes through the pipe 25 into the heating flue 33 as described previously. The hot exhaust gases drawn off at the top of the kiln 7 are sucked out through the pipe 21 into the duct 4 formed as a drier for the grains 1, and are sucked away by the fan 32.

The main difference between the installation diagrammatically illustrated in FIGURE 4 and that of FIGURE 3 is that the fired or sintered grains are drawn off out of the kiln chamber 11 in a different way. For this purpose, in FIGURE 4 the air current coming from the pipe 25 is diverted through a pipe 44 by suitable adjustment of an adjustable pivoted valve 40; for this purpose, a hinged valve 41 must also be in the open position. The air current then finally passes into the pipe 21 and thence into the drying duct 4. When the air current is being diverted during the discharge of the kiln charge, an adjustable pivoted valve 39, arranged in the pipe leading away from the top of the kiln, is in the closed position. The path of the air current during diversion, and the positions of the pivoted valves 39, 40 and 41, are shown in dot-dash lines and in broken lines in the drawing. In the firing position, the air current follows the path shown by the arrows drawn in full lines, that is to say, from the heating flue 33 into the kiln chamber 11 and thence through the ducts 37 and 21 into the drying duct 4. The positions of the valves 39, 40 and 41 during firing are also shown in full lines.

I claim:

In an apparatus for treating blowable material in the form of small particles in a fluidized bed directly carried by a hot gas stream in a reaction chamber with means for discharging the blown particles at the top of the reaction chamber, comprising a reaction chamber of double frusto-conical shape with an enlarged lower portion of greater length and a constricted upper portion of shorter length, discharging means for gas and blown particles connected to the top of said upper portion, burner means for said reaction chamber, said burner means being arranged in a channel whose axial is oblique to the axis of the reaction chamber, said channel being connected to the bottom of the lower portion of the reaction chamber to convey pressurized hot gases of the burner means to the lower portion of the reaction chamber, a separator, connecting means between the discharging means of the reaction chamber and said separator, a preheating means for the fresh unblown particles, a duct connecting said separator and said preheating means for conveying hot waste gas from the separator to the preheating means, a cooling chamber for the hot blown material separated from the gas in said separator, a conveying means connecting said cooling chamber to the separator, an air duct for supplying fresh pressurized air to the burner means, said cooling chamber being inserted in the path of the pressurized fresh air so as to be passed by the air in counterflow to the hot particles falling from the separator into the cooling chamber, and a further duct connecting said separator to the fresh-air duct between the reaction chamber and the cooling chamber for conveying to said burner means part of the waste gas leaving the separator.

References Cited in the file of this patent

UNITED STATES PATENTS

| | | |
|---|---|---|
| 2,529,366 | Bauer | Nov. 7, 1950 |
| 2,650,084 | White | Aug. 25, 1953 |
| 2,666,632 | Culver et al. | Jan. 19, 1954 |
| 2,670,193 | Pyzel | Feb. 23, 1954 |
| 2,684,840 | Behme et al. | July 27, 1954 |
| 2,774,661 | White | Dec. 18, 1956 |
| 2,833,622 | Roberts et al. | May 6, 1958 |
| 2,853,241 | Gindoff et al. | Sept. 23, 1958 |
| 2,871,004 | Gorin | Jan. 27, 1959 |
| 2,874,950 | Pyzel | Feb. 24, 1959 |